3,440,286
PROCESS FOR MAKING ARYL ALKYL SULF-
OXIDES FROM ALKYL ALUMINUM HALIDES
AND ARYL SULFONIC ACID HALIDES
Heinz Reinheckel and Dietrich Jahnke, Berlin, Germany,
assignors to Deutsche Akademie der Wissenschaften zu
Berlin, Berlin-Adlershof, Germany
No Drawing. Filed Apr. 18, 1966, Ser. No. 543,032
Int. Cl. C07c 147/00
U.S. Cl. 260—607                                       5 Claims

ABSTRACT OF THE DISCLOSURE

Arylsulfoxides of the formula R—SO—R' in which R is phenyl or tolyl and R' is an aliphatic radical, are prepared by reacting $R'_nAlX_{3-n}$ in which R' is as above, X is halogen and $n$ is 1, 2 or 3 with a tolyl or benzene sulfonic acid halide and hydrolyzing the reaction mixture.

---

The present invention relates to a process for making arylsulfoxides.

More particularly, the invention relates to making arylsulfoxides by means of aluminum alkyls.

It is already known that sulfoxides are mainly produced by oxidation of the respective sulfides, essentially by oxygen in the presence of nitrogen oxides as catalysts, or by means of hydrogen peroxide. According to German Patent 1,133,723 dialkyl sulfoxides may also be prepared by alkylaluminum compounds and thionyl chloride.

No process has been known up to now in which sulfoxides with various substituents are made from sulfonic acid halides.

The Grignard reaction with aromatic sulfonic acid chlorides does not lead to uniform products and does not render possible the preparation of sulfoxides on a technical scale.

It is the object of the present invention to provide a process for the preparation of arylsulfoxides which uses starting materials that are readily available for technical purposes and which operates with the aid of aluminum alkyl compounds.

Other objects and advantages of the present invention will become apparent from the following detailed description.

According to the invention arylsulfoxides of the general formula

R—SO—R' are obtained, in which R is an aromatic radical, which may be substituted, R' stands for an aliphatic, cycloaliphatic arylaliphatic or aromatic radical, or a mixture of the same, by reacting compounds of the general formula $R'_nAlX_{3-n}$ (in the following called aluminumalkyl) with aromatic sulfonic acid halides: in the last mentioned formula R' has the above indicated meaning, X stands for halogen, and $n$ is 1–3; the reaction may also proceed with mixtures of aluminum alkyls.

For ethylaluminum dichloride the following reaction takes place

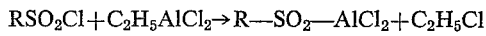
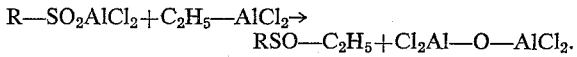

The reaction can be carried out in the presence of an inert solvent or without solvent. The reaction mixture is subsequently hydrolysed with water or alcohol. The process according to the invention may be effected in single-stage or two-stage operation.

When single-stage operation is chosen from one mol of aromatic sulfonic acid halide and two mols aluminum alkyl theoretically one mol arylsulfoxide is obtained, with one mol organohalide being obtained as byproduct.

When working in a two-stage operation, in the first stage a known reaction occurs between one mol of aromatic sulfonic halide and one mol of readily obtainable, inexpensive ethylaluminum sesquichloride or ethylaluminum dichloride yielding sulfinate with ethylchloride escaping. In the second stage, the aluminum sulfinate is alkylated to the corresponding arylsulfoxide.

The following examples are mentioned for preferred aluminum alkyls and alkyl aluminum chlorides wherein the alkyl is no more than 6 carbon atoms.

Triethylaluminum, ethylaluminumsesquichloride, tri-n-hexylaluminum, di-n-hexylaluminum chloride and mixtures of higher aluminumtrialkyls from the addition of lower aluminumtrialkyls to ethylene and alkylaluminum halides made therefrom. Preferred aromatic sulfonic acid halides are benzenesulfonic acid chloride and p-toluenesulfonic acid chloride.

Inert solvents used are particularly aliphatic hydrocarbons e.g. n-hexane and gasoline, cycloaliphatic hydrocarbons e.g. n-cyclohexane and partly halogenated hydrocarbons such as methylene chloride. The conversion occurs preferably under a protective gas atmosphere e.g. nitrogen or noble gas, at a temperature between 0 and 50° C. In general, however, a temperature range between —50° C. and +150° C. is useful.

The following operating conditions are used to advantage.

When operating in one stage, one mol sulfonic acid halide is reacted with two mols of aluminum alkyl.

When a two-stage process is used, one mol sulfonic-acid halide and one mol of the inexpensive ethyl aluminum compound are combined, and thereafter one mol of the necessary aluminum alkyl is added.

It is advantageous to provide one of the reaction partners in solution or without solution, and the other reaction partner, likewise dissolved or undissolved, is then added with stirring and with passage of inert gas in the temperature range mentioned above. In some reactions it is advisable to heat for a short time to 50–150° C. after the reaction has taken place, provided that low temperatures were maintained during the reaction.

The aryl sulfoxides are obtained after dilution of the reaction mixture with organic diluents, such as ether or gasoline, by hydrolysis with water or alcohols at temperatures of preferably 0–20° C., acidifying with diluted mineral acid, such as sulfuric acid, extraction of the aqueous solution with an organic solvent, and fractionation of the residue after evaporation of the solvent at reduced pressure. The yields are between 60 and 85% of the theoretical. Sometimes small quantities of the corresponding sulfides are obtained as a first run, which however are easily separated from the arylsulfoxides during fractionation.

The byproduct obtained in the one-stage process, namely alkyl-, cycloalkyl-, aralkyl- or aryl halide, is very pure and it can easily be separated by distillation.

When working in the two-stage process, ethyl chloride is always produced, which is to be used as starting material for a new batch of ethylaluminum sequichloride. Thus the process according to the invention requires in the two-stage process for the first stage mostly the use of aluminum only, since upon use of ethylaluminum sesquichloride ⅔ of the ethyl groups, and when ethyl aluminum dichloride is used, all the ethyl groups are obtained in the form of ethylchloride and can be used for the new preparation of ethylaluminum sesquichloride.

The advantage of the process according to the invention consists primarily in the fact that arylsulfoxides may be obtained in good yields from the readily accessible aromatic sulfonic acid halides, by means of aluminumalkyls.

Furthermore it is possible to prepare arylalkylsulfoxides of any desired chain length independent of the aromatic radical.

The arylsulfoxides obtainable according to the invention may be used as emulsion polymerization catalysts, insecticides, and recently also as pharmaceuticals or carrier substances in the pharmaceutical industry.

The invention will now be more fully described in a number of examples. Parts are by weight.

Example 1

9.5 parts triethylaluminum without solvent are dropped into 7.0 parts benzenesulfonic acid chloride in 20 parts methylene chloride with stirring and while nitrogen is passing over at room temperature. The ethylchloride produced duing the reaction is collected in a cooling tap. The reaction mixture warms up while the conversion occurs. It is maintained boiling by adding drop by drop of triethylaluminum and is boiled for 30 minutes more while stirring. After having been diluted with gasoline, the reaction mixture while being cooled, is decomposed by water at room temperature and is acidified with diluted sulfuric acid. Gasoline extraction, drying of the organic solution, evaporated of the solvent and fractionation of the almost pure residue yield 5.0 parts (81% of the theory) ethylphenyl sulfoxide of the B.P. $_{0.025}$=81.5–82° C.; $n_D^{20}$=1.5663. The first run contains 0.6 part (11% of the theory) ethylphenyl sulfide of B.P.$_{10}$=90° C.

Example 2

As described in Example 1, 25.0 parts ethylaluminum sesquichloride in 25 parts gasoline are dropped into 19.0 parts p-toluenesulfonic acid chloride in 20 parts gasoline with collection of ethyl chloride. The mixture is maintained at a temperature of 40–50° C. during the reaction. The decomposition and workup occurring in accordance with Example 1 yields 12.8 parts (76% of the theory) ethyl-p-tolyl sulfoxide of the B.P.$_{0.02}$=90.5–91.5° C.;

$$n_D^{20}=1.5620$$

The first run contains 3.0 parts (20% of the theory) ethyl-p-tolyl sulfide B.P.$_5$=81.5–82° C.

Example 3

In accordance with Example 1, 23.0 parts tri-n-hexyl-aluminum are added dropwise to 7.1 parts benzenesulfonic acid chloride. The reaction mixture is maintained at a temperature of 40 to 50° C. by exothermic reaction and after addition of tri-n-hexylaluminum is stopped, the mixture is heated to 70° C. for 30 minutes. Then n-hexyl chloride is distilled off at reduced pressure, and obtained are 4.6 parts (94% of the theory).

The residue is decomposed and worked up as described in Example 1. Fractionation yields 6.0 parts n-hexylphenyl sulfoxide (70% of the theory) of B.P.$_{0.09}$=105–110° C.; $n_D^{20}$=1.5233.

Example 4

In analogy to Example 1, 12.5 parts of ethylaluminum sesquichloride, undiluted, and 17.6 parts of benzene-acid-chloride in 40 parts methylene chloride, corresponding to a molar ratio 1:1, are added drop by drop; the ethylchloride formed is collected in a cooling trap. Subsequently, the reaction mixture is maintained at boiling temperature for 30 minutes. At the same temperature 23.5 parts di-n-hexylaluminum chloride are added drop by drop, corresponding again to a mol ratio 1:1. After the reaction is terminated, the mixture is heated for one more hour. Decomposition and workup occur, as described in Example 1, yields are 13.0 parts (62% of the theory) n-hexylphenyl sulfoxide, B.P.$_{0.3}$=125–130° C.; $n_D^{20}$=1.5228.

What is claimed is:

1. A process for preparing arylsulfoxides of the general formula R—SO—R′, wherein R is a phenyl or tolyl radical and R′ is alkyl of no more than 6 carbon atoms, which comprises reacting at a temperature of from −50 to +150° C. compounds of the formula $R'_n AlX_{3-n}$ wherein R′ is as defined above, X stands for halogen, and $n$ is 1–3 or mixtures of these compounds, with a tolyl or benzene sulfonic acid halide in the molar proportion of the former to the latter of 2:1, diluting the reaction mixture formed with an organic solvent, and hydrolyzing the same with water or alcohols.

2. The process as claimed in claim 1, wherein the reaction is conducted in one stage.

3. The process as claimed in claim 1, wherein in a two-stage process first sulfonic acid halide is reacted with ethylaluminum sesquichloride or ethylaluminum dichloride in equimolar proportions, and subsequently to the thus produced aluminum sulfinate and in proportion equimolar thereto the required aluminum alkyl is added.

4. The process according to claim 1, wherein the process is carried out in a solvent consisting of an aliphatic, cycloaliphatic or partially halogenated hydrocarbon.

5. The process according to claim 1, wherein the reaction temperature is maintained at 0–50° C.

References Cited

UNITED STATES PATENTS 2,947,787  8/1960  Flanagan _____ 260—607

CHARLES B. PARKER, *Primary Examiner.*

D. R. PHILLIPS, *Assistant Examiner.*

U.S. Cl. X.R.

23—52; 260—448, 652